United States Patent [19]

Freese et al.

[11] Patent Number: 5,575,920
[45] Date of Patent: Nov. 19, 1996

[54] METHOD OF INHIBITING SCALE AND CONTROLLING CORROSION IN COOLING WATER SYSTEMS

[75] Inventors: Donald T. Freese, Glenside; Libardo A. Perez, Morrisville; Keith A. Bair, Horsham; Fu Chen, Newtown, all of Pa.

[73] Assignee: BetzDearborn Inc., Trevose, Pa.

[21] Appl. No.: 529,385

[22] Filed: Sep. 18, 1995

Related U.S. Application Data

[63] Continuation of Ser. No. 209,807, Mar. 11, 1994, abandoned.

[51] Int. Cl.$^6$ ........................................... C02F 5/14
[52] U.S. Cl. ........................ 210/697; 210/698; 210/699; 210/701; 252/180; 252/181; 252/395; 422/15; 422/17
[58] Field of Search ...................... 210/698–701, 210/697; 252/180, 181, 389.2, 389.24, 389.52, 395; 422/15, 17, 19

[56] References Cited

U.S. PATENT DOCUMENTS

| | | | |
|---|---|---|---|
| 4,471,100 | 9/1984 | Tsubakimoto et al. | 525/367 |
| 4,659,482 | 4/1987 | Chen | 210/699 |
| 4,671,880 | 6/1987 | Wisener et al. | 210/699 |
| 4,869,845 | 9/1989 | Chen | 252/181 |
| 4,872,995 | 10/1989 | Chen et al. | 210/699 |
| 5,109,482 | 4/1992 | Bohrman | 395/154 |
| 5,124,046 | 6/1992 | Sherwood et al. | 210/701 |
| 5,158,685 | 10/1992 | Freese | 210/699 |
| 5,169,537 | 12/1992 | Chen | 210/701 |
| 5,180,498 | 1/1993 | Chen et al. | 210/697 |
| 5,191,645 | 3/1993 | Carlucci et al. | 395/159 |
| 5,206,929 | 4/1993 | Langford et al. | 395/159 |
| 5,237,648 | 8/1993 | Mills et al. | 395/152 |
| 5,248,438 | 9/1993 | Perez | 210/701 |
| 5,282,976 | 2/1994 | Yeung | 210/698 |
| 5,307,456 | 4/1994 | MacKay | 395/154 |
| 5,388,197 | 2/1995 | Rayner | 395/154 |
| 5,404,316 | 4/1995 | Klingler et al. | 395/161 X |
| 5,481,296 | 1/1996 | Cragun et al. | 348/13 |
| 5,485,197 | 1/1996 | Hoarty | 348/12 X |

FOREIGN PATENT DOCUMENTS

| | | |
|---|---|---|
| 123108 | 10/1984 | European Pat. Off. |
| 184894 | 6/1986 | European Pat. Off. |
| 337694 | 10/1989 | European Pat. Off. |
| 56-155692 | 3/1982 | Japan |
| 58-058285 | 4/1983 | Japan |
| 58-224180 | 12/1983 | Japan |
| 59-023885 | 2/1984 | Japan |
| 62-068806 | 3/1987 | Japan |

OTHER PUBLICATIONS

Murie, "Media Maker Makes Mac Move", Mac Week, Mar. 26, 1991, pp. 53–56.

Tonomura et al, "Content Oriented Visual Interface Using Video Icons for Visual Database Systems", IEEE, 1989, pp. 68–73.

Mills et al, "A Magnifier Tool for Video Data", ACM, 1992, pp. 93–98.

*Primary Examiner*—Peter A. Hruskoci
*Attorney, Agent, or Firm*—Alexander D. Ricci; Richard A. Paikoff

[57] ABSTRACT

A method for simultaneously controlling the deposition of scale and the formation of corrosion in a cooling water system consisting of adding to the system a water soluble copolymer having the structure:

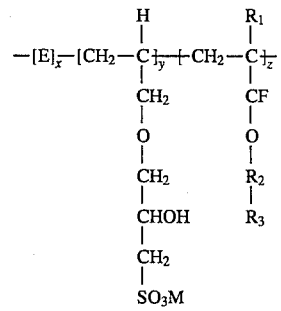

wherein $R_1$ is H or lower ($C_1$-$C_4$) alkyl, F is $H_2$ or O, M is a water soluble cation, $R_2$ is $(CH_2\text{—}CH_2\text{—}O)_n$,

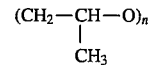

or mixture of both, n is an integer of from 1 to about 40, $R_3$ is H, lower ($C_1$-$C_4$) alkyl or an acetate.

12 Claims, No Drawings

5,575,920

METHOD OF INHIBITING SCALE AND CONTROLLING CORROSION IN COOLING WATER SYSTEMS

This is a continuation of application Ser. No. 08/209,807 filed Mar. 11, 1994 now abandoned.

FIELD OF THE INVENTION

The present invention pertains to a method of inhibiting corrosion and scale formation on heat transfer surfaces in contact with the water in a cooling water system.

BACKGROUND OF THE INVENTION

The problems of corrosion and scale formation and attendant effects have troubled water systems for years. For instance, scale tends to accumulate on internal walls of various water systems, such as cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an accumulation of these scale imparting compounds along or around the metal surfaces which contact the flowing water circulating through the system. In this manner, heat transfer functions of the particular system are severely impeded.

Corrosion, on the other hand, is a degradative electrochemical reaction of a metal with its environment. Simply stated, it is the reversion of refined metals to their natural state. For example, iron ore is iron oxide. Iron oxide is refined into steel. When the steel corrodes, it forms iron oxide which, if unattended, may result in failure or destruction of the metal, causing the particular water system to be shut down until the necessary repairs can be made.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

Internal treatment, i.e., treatment of the water fed to the system, is necessary to prevent, reduce and/or retard formation of the scale imparting compounds and their resultant deposition. The carbonates of magnesium and calcium are not the only problem compounds as regards scale but also waters having high contents of phosphate and sulfate ions either occurring naturally or added for other purposes cause problems since calcium and magnesium, and any iron or copper present, react with each and deposit as scale. As is obvious, the deposition of scale on the structural parts of a cooling water system causes poorer circulation and lower heat transfer capacity, resulting accordingly in an overall loss in efficiency.

Many conventional scale and corrosion inhibitors exhibit acceptable utility at temperatures up to about 120° F. heat transfer surface temperature. However, beyond that temperature their effectiveness deteriorates. This operating temperature limitation and other problems have been overcome by the present invention.

DETAILED DESCRIPTION OF THE INVENTION

In accordance with the invention, it has been discovered that certain water soluble terpolymers, as shown in Formula I hereinafter, are effective in controlling the deposition of scale and inhibiting the formation of corrosion in higher temperature (e.g., at 120° F. skin temperature) heat exchange zones of a cooling water system. These terpolymers are especially effective at temperatures up to 160° F.

The water soluble terpolymers of the invention have the structure:

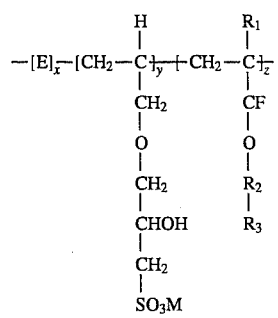

where E of Formula I comprises the repeat unit obtained after polymerization of an alpha, beta ethylenically unsaturated monomer, preferably a carboxylic acid, amide form thereof, or lower alkyl ($C_1$-$C_6$) ester or hydroxylated lower alkyl ($C_1$-$C_5$) ester of such carboxylic acids. Exemplary compounds encompassed by E include, but are not restricted to, the repeat unit formed by polymerization of acrylic acid, methacrylic acid, acrylamide, maleic acid or anhydride, fumaric acid, itaconic acid, 2-hydroxy-propyl acrylate, styrene sulfonic acid, and 2-acrylamido-2-methylpropane-sulfonic acid and the like. Water soluble salt forms of these acids are also within the purview of the invention. $R_1$ in Formula I is H or lower ($C_1$-$C_4$) alkyl, F is $H_2$ or O, M is a water soluble cation, $R_2$ is $(CH_2-CH_2-O)_n$,

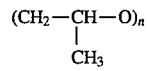

or mixture of both, n is an integer of from about 1 to about 40, $R_3$ is hydrogen, lower ($C_1$-$C_4$) alkyl, or an acetate formed as a cap on the polyethyleneglycol moiety by reacting an acetylating agent with an allyl ether polyethyleneglycol which is then reacted with the alpha, beta ethylenically unsaturated compound E to form the copolymer of Formula I. Suitable acetylating agents include acetic acid, acetic anhydride, acetyl chloride, and the like as described in U.S. Pat. Nos. 4,959,156 and 4,847,410 fully incorporated herein by reference.

Turning to monomer y in the above Formula, these types of monomers may generally be produced by reacting allyl alcohol with a non-tertiary alcohol in the temperature range of about 25°–150° C., as is detailed in U.S. Pat. No. 2,847,477 (the entire disclosure of which is hereby incorporated by reference). The allyl hydroxy propyl sulfonate ether (AHPSE) monomer disclosed may be prepared via a ring opening reaction of the epoxy group with sodium sulfite in the presence of a phase transfer catalyst such as tetra-n-butylammonium bisulfite or with fuming sulfuric acid containing sulfur trioxide which will produce the sulfonic acid group and the hydroxy group. The resulting monomer can be further neutralized with caustic or other basic material. The reaction is illustrated by the following mechanism:

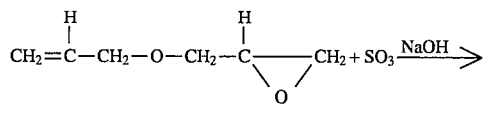

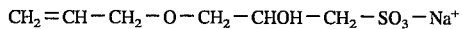

Monomer z is referred to as polyethylene glycol allyl ether (PEGAE) when F=$H_2$ and polyethylene glycol monomethacrylate (HEM) when F=O. PEGAE and HEM are prepared by ethoxylation of allyl alcohol and methacrylate ester, respectively. They are both commercially available from Rhone-Poulenc.

Polymerization of the monomers may proceed in accordance with conventional solution, precipitation or emulsion polymerization techniques. Conventional polymerization initiators such as azo compounds, persulfates, peroxides, UV light, etc., may be used. Chain transfer agents such as alcohols (preferably isopropanol), amine or mercapto compounds may be used to regulate the molecular weight of the polymer. The resulting polymer may be isolated by well known techniques including precipitation, etc. If polymerized in water, the polymer may simply be used in its aqueous solution.

The molar ratios of the three monomeric units x:y:z is approximately 1–10:1–4:1–4. The preferable ratio is in the range of 3–6:1–3:1–2.

The number average molecular weight of the water soluble or water dispersible terpolymers of Formula I is not critical and may fall within the Mn range of about 1,000 to 100,000, desirably 1,000 to 30,000 and more desirably 1,500 to 10,000. The key criteria is that the terpolymer be water soluble or water dispersible.

The terpolymers should be added to the cooling water system, for which corrosion inhibiting, and/or deposit control activity is desired, in an amount effective for the purpose. This amount will vary depending upon the particular system for which treatment is desired and will be influenced by factors such as, the area subject to corrosion, pH, temperature, water quantity and the respective concentrations in the water of the potential scale and deposit forming species. For the most part, the polymers will be effective when used at levels of about 0.1–500 parts per million parts of water. The polymers may be added directly into the desired water system in a fixed quantity and in the state of an aqueous solution, continuously or intermittently.

The water soluble polymers of the present invention can also be used with topping agent components in order to enhance the corrosion inhibition and scale controlling properties thereof. For instance the polymers may be used in combination with one or more kinds of compounds selected from the group consisting of phosphoric acids and phosphonic acids and water soluble salts thereof. Such topping agents may be added to the system in an amount of from about 1 to 500 ppm. The weight ratio of the polymer to topping agents may vary from 100:1 to 1:5.

Examples of such phosphoric acids include condensed phosphoric acids and water soluble salts thereof. The phosphoric acids include an orthophosphoric acid, a primary phosphoric acid and a secondary phosphoric acid. Condensed phosphoric acids include polyphosphoric acids such as pyrophosphoric acid, tripolyphosphoric acid and the like, metaphosphoric acids such as trimetaphosphoric acid, and tetrametaphosphoric acid.

As to the other phosphonic acid derivatives which are to be added in addition to the polymers of the present invention, there may be mentioned aminopolyphosphonic acids such as aminotrimethylene phosphonic acid, ethylenediaminetetramethylene phosphonic acid and the like, methylene diphosphonic acid, hydroxy ethyl idene diphosphonic acid (HEDP), 2-phosphono-butane 1,2,4 tricarboxylic acid, and hydroxy phosphonoacetic acid. The polymers may be used in combination with yet other topping agent including corrosion inhibitors for iron, steel, copper, copper alloys or other metals, conventional scale and contamination inhibitors, and other conventional water treatment agents. Other corrosion inhibitors comprise tungstate, nitrites, borates, silicates, oxycarboxylic acids, catechols, zinc salts, molybdates and aliphatic amino surface active agents. Other scale and contamination inhibitors include lignin derivatives, tannic acids, starch, polyacrylic soda, polyacrylic amide, etc.

The water soluble polymers may be added separately to the aqueous system or may be blended with the above topping agents compounds and then added in the state of aqueous solution into the water system either continuously or intermittently.

EXAMPLES

The invention will now be further described with reference to a number of specific examples which are to be regarded solely as illustrative and not as restricting the scope of the invention.

Free radical solution techniques were used to prepare the terpolymers of the present invention. Water was employed as the solvent, isopropyl alcohol was used as the chain transfer agent and sodium persulfate as the initiator. The allylic monomers were added to the water blend and the acrylate monomers co-fed with the initiator at 85° C. Carbon-13 NMR was then utilized to verify that polymerization was complete and that the integrity of the desired polymers survived the polymerization process. Table I shows the make-up of each of the copolymers prepared and their physical properties.

TABLE I

| Example | Monomers | Ratios | Solids | Viscosity | pH |
|---|---|---|---|---|---|
| 1 | AA/AHPSE/PEGAE =10 | 6/1/1 | 24.2 | 11.7 | 4.4 |
| 2 | AA/AHPSE/PEGAE=4 | 6/1/1 | 24.3 | 10.4 | 4.3 |
| 3 | AA/AHPSE/EP1404 | 6/1/1 | 24.9 | 11.8 | 4.5 |
| 4 | AA/AHPSE/PEGAE=10 | 6/2/1 | 25.0 | 10.0 | 4.5 |
| 5 | AA/AHPSE/PEGAE=4 | 6/2/1 | 25.4 | 9.7 | 4.5 |
| 6 | AA/AHPSE/EP1404 | 6/2/1 | 24.9 | 11.6 | 4.6 |
| 7 | AA/AHPSE/PEGAE=4 | 10/1/1 | 24.9 | 10.0 | 4.4 |
| 8 | AA/AHPSE/PEGAE=15 | 10/1/1 | 26.7 | 12.5 | 4.5 |
| 9 | AA/AHPSE/PEGAE=4 | 3/1/1 | 25.2 | 7.8 | 4.6 |

TABLE I-continued

| Example | Monomers | Ratios | Solids | Viscosity | pH |
|---|---|---|---|---|---|
| 10 | AA/AHPSE/PEGAE=10 | 3/1/1 | 25.0 | 9.3 | 4.6 |
| 11 | AA/AHPSE/HEM5 | 3/1/1 | 25.2 | 11.9 | 4.1 |
| 12 | AA/AHPSE/HEM10 | 3/1/1 | 25.1 | 12.7 | 4.3 |
| 13 | AA/AHPSE/HEM5 | 6/2/1 | 24.6 | 8.8 | 4.0 |
| 14 | AA/AHPSE/HEM10 | 6/1/1 | 25.4 | 10.1 | 4.0 |
| 15 | AA/AHPSE/HEM10 | 6/2/1 | 25.4 | 10.1 | 4.1 |
| 16 | AA/AHPSE/HEM5 | 6/1/1 | 25.4 | 9.6 | 4.0 |
| 17 | AA/AHPSE/HEM5 | 10/1/1 | 24.8 | 12.9 | 4.1 |
| 18 | AA/AHPSE/HEM10 | 10/1/1 | 25.4 | 14.1 | 4.1 |

AA—acrylic acid
AHPSE—allyloxy-2-hydroxypropyisulfonic acid
PEGAE—polyethyleneglycol allyl ether, n = avg. number of glycol repeat units
EP1404—polyethylene/propylene glycol allyl ether/14 = EO units 4 = PO units
HEM—polyethyleneglycol monomethacrylate, n = avg. number of glycol repeat units Static Calcium Phosphate Scale Inhibition Table II summarizes static calcium phosphate inhibition testing for these polymers at varying treatment levels. The tests were conducted by adding the treatment to a solution containing calcium and magnesium of the described conditions. Another solution containing phosphate and carbonate was added and the mixture incubated at 158° F. for 18 hours. The pH of the solution at 158° F. was 8.2. After the 18 hours, a measured portion of the hot solution was filtered and analyzed for phosphorus determination by using inductively coupled plasma atomic emission (ICP). From the analysis results the % inhibition was calculated by using the following relationship $$\% \text{ Inhibition} = \frac{\text{ppm PO}_4 \text{ (treated)} - \text{ppm PO}_4 \text{ (control)}}{\text{ppm PO}_4 \text{ (stock)} - \text{ppm PO}_4 \text{ (control)}} \times 100$$

The conditions of the test were: 400 ppm Ca as $CaCO_3$, 100 ppm Mg as $CaCO_3$, 50 ppm Malk as $CaCO_3$, 10 ppm $PO_4$ as $PO_4$, pH 8.2, 158° F., 18 hours test duration.

TABLE II

| | | % INHIBITION* AT ppm ACTIVE | | | |
|---|---|---|---|---|---|
| EXAMPLE | TREATMENT | 10 | 12 | 15 | 20 |
| 1 | AA/AHPSE/PEG-10 | 4(4) | 12(2) | 80(4) | 95(4) |
| 2 | AA/AHPSE/PEG-4 | 2(3) | 13(2) | 48(4) | 98(4) |
| 3 | AA/AHPSE/EP1404 | 20(4) | | 18(2) | 88(2) |
| 4 | AA/HPSE/PEG-10 | 8(4) | | 82(4) | 75(2) |
| 5 | AA/AHPSE/PEG-4 | 3(4) | | 83(4) | 92(2) |
| 6 | AA/AHPSE/EP1404 | 19(4) | | 38(2) | 90(2) |
| 7 | AA/AHPSE/PEG-4 | 2(2) | | 9(2) | 90(2) |
| 8 | AA/AHPSE/PEG-15 | 1(2) | | 3(2) | 80(2) |
| 9 | AA/AHPSE/PEG-4 | 15(4) | 88(2) | 96(4) | 96(4) |
| 10 | AA/AHPSE/PEG-10 | 19(4) | 89(2) | 94(4) | 95(4) |
| 11 | AA/AHPSE/HEM-5 | 2(2) | | 98(2) | 100(2) |
| 12 | AA/AHPSE/HEM-10 | 7(2) | | 97(2) | 99(2) |
| 13 | AA/AHPSE/HEM-5 | 1(2) | | 95(2) | 100(2) |
| 14 | AA/AHPSE/HEM-10 | 0(2) | | 12(2) | 94(2) |
| 15 | AA/AHPSE/HEM-10 | 2(2) | | 78(2) | 95(2) |
| 16 | AA/AHPSE/HEM-5 | 5(2) | | 63(3) | 96(2) |
| 17 | AA/AHPSE/HEM-5 | 0(2) | | 0(2) | 2(2) |
| 18 | AA/AHPSE/HEM-10 | 0(2) | | 3(2) | 81(2) |

*average % inhibition with number of tests in parenthesis.
NOTE: in PEG-n or HEM-n, n is the number of PEGAE or HEM units in the polymer; for EP1404 there are 14 —($CH_2$—$CH_2$—O—) units and 4 —($CH_2$—CH—O—) units in the polymer structure.
    |
    $CH_3$ Calcium Phosphonate Scale Inhibition A static beaker test was used for the testing of the polymers as calcium phosphonate inhibitors. The tests were conducted by adding the treatment to a solution containing 1500 ppm Ca as $CaCO_3$, 10 ppm (active) Dequest 2010 (hydroxyethylidene diphosphonic acid) at pH 8.5 and incubated for 18 hours at 158° F. The pH was buffered with 0.01M sodium borate. After the incubation period, a portion of the solution was hot filtered and phosphorus concentration was determined by Inductively Coupled Plasma. The extent of the inhibition was determined by using the following:

$$\% \text{ Inhibition} = \frac{\text{ppm P (treated)} - \text{ppm P (control)}}{\text{ppm P (stock)} - \text{ppm P (control)}} \times 100$$

Table III summarizes the results for this test.

TABLE III

| TREATMENT | % INHIBITION* AT ppm ACTIVE | | |
|---|---|---|---|
| EXAMPLE | 5.0 | 10.0 | 15.0 |
| 9 | 22.7 | 49.9 | 80.2 |
| 10 | 37.8 | 80.8 | 86.0 |

*Average of two tests.

Calcium Carbonate Scale Inhibition

Dynamic beaker calcium carbonate inhibition testing results are summarized in Table IV. The tests were conducted by adding the treatment to a solution containing calcium and carbonate ions and having a pH of 8.74 at 133° F. Admiralty coupons were suspended in the solutions. The mixtures were incubated in a shaking water bath for 66 hours at 133° F. After cooling, a measured portion was filtered and the pH adjusted to less than 2.0 with hydrochloric acid. The mixture was diluted and the pH adjusted to 12 with sodium hydroxide. A calcium indicator, murexide, was added and the solution titrated to a pure-violet end point with ethylenediaminetetraacetic acid. Percent inhibition was calculated from titrations of the treated, stock, and control solutions according to the following:

$$\% \text{ Inhibition} = \frac{\text{ppm Ca (treated)} - \text{ppm Ca (control)}}{\text{ppm Ca (stock)} - \text{ppm Ca (control)}} \times 100$$

Deposition on the suspended non-heat transfer surface was detected by visual inspection. The conditions of the test were: 600 ppm Ca as $CaCO_3$; 300 ppm Mg as $CaCO_3$; 400 ppm Malk as CaCO₃; 288 ppm SO₄; 425 ppm Cl; 187 ppm Na; pH 8.74 at 56° C. (132.8° F.); 3 ppm TTA (tolyltriazole) was used in all of the tests for cooper metal corrosion control.

TABLE IV

| TREATMENT EXAMPLE | ppm ACTIVE | % INHIBITION* | COUPON DEPOSITION RATING** |
|---|---|---|---|
| 1 | 10 | 27.0 (4) | 2 |
|   | 20 | 28.6 (4) | 4 |
| 2 | 10 | 29.0 (2) | 4 |
|   | 20 | 29.6 (2) | 4 |
| 3 | 10 | 26.8 (2) | 2 |
|   | 20 | 28.4 (2) | 2 |
| 4 | 10 | 24.2 (2) | 2 |
|   | 20 | 26.4 (2) | 2 |
| 5 | 10 | 25.8 (2) | 2 |
|   | 20 | 28.1 (1) | 2 |
| 6 | 10 | 24.6 (2) | 2 |
|   | 20 | 25.8 (2) | 3 |
| 7 | 10 | 34.4 (2) | 2 |
|   | 20 | 33.9 (2) | 4 |
| 8 | 10 | 30.7 (2) | 3 |
|   | 20 | 30.9 (2) | 3 |
| 9 | 10 | 11.7 (1) | 4 |
|   | 20 | 17.2 (2) | 2 |
| 10 | 10 | 21.7 (2) | 3 |
|    | 20 | 20.5 (2) | 3 |

*average percent inhibition with number of tests in parenthesis
**Clean-1; Very Slight Deposit-2; Slight Deposit-3; Moderate Deposit-4

Recirculator Testing for Scale and Corrosion Inhibition.

Recirculator tests were conducted in the Bench Top Recirculator Units. These recirculator units are designed to provide a realistic measure of the ability of a treatment to prevent corrosion and scale formation under heat transfer conditions. The treated water is circulated through a corrosion coupon by-pass rack, into which corrosion coupons are inserted, and the water passes a heat exchanger tube contained in a Plexiglas block. The heat exchanger is fitted with an electric heater so that the heat load on the heat exchanger tube can be varied and controlled in the 0 to 16,000 BTU/ft2/hr. range. The water velocity past the exchanger can be controlled in the 0 to 6.7 ft/sec. range. The pH and temperature of the circulating water are automatically controlled. The treated water is prepared by the addition of the component ions to deionized water. Provisions for continuous makeup and blowdown are made by pumping fresh treated water from supply tanks to the sump of the unit, with overflow from the sump serving as blowdown. The total system volume is about 12 L.

The water composition for the test was: 600 ppm Ca, 300 ppm Mg, 50 Malk (all three as CaCO₃) 12 ppm PO₄, 6 ppm pyrophosphate (as PO₄), 2.4 ppm active Dequest 2010 (HEDP). The flow rate was 4 gpm and the pH 7.2. pH was controlled by CO₂ addition.

In the test, Example 10 at 7 ppm (active) prevented scale and improved the capability of ortho-phosphate to control corrosion on mild steel (LCS) and admiralty heat transfer surfaces at 120° F. water temperature and 135° F. skin temperature for six days. Insignificant deposition developed on the LCS surface. The admiralty coupons were free of deposit. The corrosion rates for LCS and admiralty were 0.7 and 0.8 mpy, respectively.

What we claim is:

1. A method for simultaneously controlling the deposition of scale and the formation of corrosion in a cooling water system comprising adding to said system an effective amount for the purpose of a water soluble terpolymer having the structure:

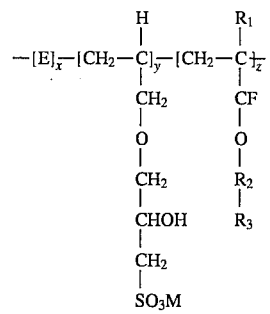

wherein E is a repeat unit obtained after polymerization of an alpha, beta ethylenically unsaturated carboxylic acid or sulfonic acid monomer, amide form thereof, or lower alkyl ($C_1$-$C_6$) ester or hydroxylated lower alkyl ($C_1$-$C_5$) ester of said carboxylic acid, and salts thereof, the molar ratio of x:y:z is approximately 1–10:1–4:1–4, $R_1$ is H or lower ($C_1$-$C_4$) alkyl, F is $H_2$ or O, M is a water soluble cation, $R_2$ is $(CH_2-CH_2-O)_n$,

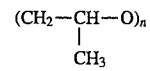

or mixture of both, n is an integer of from 1 to about 40, $R_3$ is H, lower ($C_1$-$C_4$) alkyl or an acetate wherein the temperature of the cooling water system is in excess of 120° F.

2. The method of claim 1 wherein the terpolymer has a molecular weight (Mn) of between about 1,000 and 100,000.

3. The method of claim 2 wherein the terpolymer has a molecular weight (Mn) of between about 1,000 and 30,000.

4. The method of claim 3 wherein the terpolymer has a molecular weight (Mn) of between about 1,500 and 10,000.

5. The method of claim 1 wherein the terpolymer is added to the water in the cooling water system in an amount of 0.1–500 parts polymer based upon 1 million parts of the water.

6. The method of claim 1 wherein the molar ratio is approximately 3–6:1–3:1–2.

7. The method of claim 1 wherein E is selected from the group consisting of acrylic acid, methacrylic acid, acrylamide, maleic acid, maleic anhydride, fumaric acid, itaconic acid, 2-hydroxy propyl acrylate, styrene sulfonic acid, 2-acrylamido-2-methylpropanesulfonic acid and salts thereof.

8. The method of claim 1 wherein monomer z is selected from the group consisting of polyethylene glycol allyl ether and polyethylene glycol monomethacrylate.

9. The method of claim 1 further comprising adding to the cooling water system an effective amount for the purpose of a topping agent selected from the group consisting of phosphoric acids and water soluble salts thereof and phosphonic acids and water soluble salts thereof.

10. The method of claim 9 wherein the phosphoric acid is a member selected from the group consisting of orthophosphoric acid, pyrophosphoric acid, tripolyphosphoric acid, trimetaphosphoric acid, tetrametaphosphoric acid and water soluble salts thereof.

11. The method of claim 10 wherein the phosphonic acid is a member selected from the group consisting of ethylene diaminetetramethylene phosphonic acid, methylene diphosphonic acid, hydroxyethylidene diphosphonic acid, 2-phosphonobutane 1,2,4-tricarboxylic acid and hydroxy phosphonoacetic acid.

12. The method of claim 10 wherein the topping agent is added to said system in an amount of 1 to about 500 parts per million parts of the water.

* * * * *

UNITED STATES PATENT AND TRADEMARK OFFICE
CERTIFICATE OF CORRECTION

PATENT NO. : 5,575,920
DATED : November 19, 1996
INVENTOR(S) : Donald T. Freese, et al.

It is certified that error appears in the above-identified patent and that said Letters Patent is hereby corrected as shown below:

On title page, item [56] delete
the heading "Other Publications" and the three references listed thereunder.

On title page, item [56] under U.S. Patent Documents, delete the listed references cited.

| | | | |
|---|---|---|---|
| 5,109,482 | 4/1992 | Bohrman | 395/154 |
| 5,191,645 | 3/1993 | Carlucci et al. | 395/159 |
| 5,206,929 | 4/1993 | Langford et al. | 395/159 |
| 5,237,648 | 8/1993 | Mills et al. | 395/152 |
| 5,307,456 | 4/1994 | MacKay | 395/154 |
| 5,388,197 | 2/1995 | Rayner | 395/154 |
| 5,404,316 | 4/1995 | Klingler et al. | 395/161 X |
| 5,481,296 | 1/1996 | Cragun et al. | 348/13 |
| 5,485,197 | 1/1996 | Hoarty | 348/12 X |

Signed and Sealed this

Second Day of December, 1997

Attest:

BRUCE LEHMAN

*Attesting Officer*     *Commissioner of Patents and Trademarks*